United States Patent [19]

Muellner

[11] 4,450,968
[45] May 29, 1984

[54] NESTABLE CART ANTI-REVERSING APPARATUS

[75] Inventor: James M. Muellner, White Bear Lake, Minn.

[73] Assignee: Smarte Carte, Inc., White Bear Lake, Minn.

[21] Appl. No.: 292,357

[22] Filed: Aug. 13, 1981

[51] Int. Cl.³ ............................................. A47F 7/00
[52] U.S. Cl. ................................... 211/17; 194/4 R; 410/3
[58] Field of Search ................... 211/5, 17, 162, 49 R; 186/30, 33, 34, 62, 63, 64; 280/33.99 C, 33.99 R; 410/2, 3, 7; 104/245, 118; 194/4 R

[56] References Cited

U.S. PATENT DOCUMENTS

| 2,343,657 | 3/1944 | Fox | 211/46 |
| 2,422,862 | 6/1947 | Stottrup | 186/62 X |
| 3,772,994 | 11/1973 | Juarbe | 280/33.99 C |
| 3,897,863 | 8/1975 | Peggs | 194/4 R |
| 3,978,959 | 9/1976 | Muellner | 221/298 X |
| 4,354,604 | 10/1982 | Isaacs | 211/17 |
| 4,377,227 | 3/1983 | Sandford | 194/4 R |

Primary Examiner—Ramon S. Britts
Assistant Examiner—Robert W. Gibson, Jr.
Attorney, Agent, or Firm—Merchant, Gould, Smith, Edell, Welter and Schmidt

[57] ABSTRACT

An anti-reversing tab (54) attached to a nestable cart (14) is the subject of this application. The tab (54) extends from the cart (14) proximate a second wheel (42) thereof to engage an entry end of a channel (24) which normally captures the first wheel (40) of the cart (14).

4 Claims, 6 Drawing Figures

NESTABLE CART ANTI-REVERSING APPARATUS

TECHNICAL FIELD

The invention of this application refers broadly to the field of transport means for baggage, packages, or groceries and to automatic vending islands wherein the transport means, such as carts, are collected and dispensed. More narrowly, however, the invention is directed to apparatus for providing that the carts, when they are collected and stored at an island for subsequent dispensing, are nested in a uniform direction in order to conserve space and insure that all carts assigned to a particular island can be accommodated by the designated island.

BACKGROUND OF THE INVENTION

Versatile, low-maintenance carts have found a number of applications in today's society. Specifically, grocery stores and supermarkets beneficially use such structures. Thus specific application is not particularly new, but carts, such as used in supermarkets, have been found to have more diverse applications. One particular application which is a fairly recent innovation is use of rugged, metal frame carts at airports for the transportation of suitcases, hanging clothing bags, and other luggage. Other innovative applications are use in Customs areas and in modern sprawling shopping centers (such as shopping malls).

While in older applications, such as in supermarkets, carts are typically available to customers without charge, it has been found to be economically feasible to rent such structures in airport, Customs areas, and shopping center applications. In order to minimize the overhead involved in the operation of such a rental system, automatic, self-service cart vending systems have been devised. Such systems utilize an island by which carts are dispensed to patrons. When such islands are utilized, not only is the need for dispensing personnel eliminated, but the need for agents of the renter to collect the carts can also be obviated.

Typically, this can be accomplished by devising the island so that, when a cart is returned to the island and inserted into a receipt end thereof, the person returning the cart receives a "reward". The island, therefore, includes means for accepting money in payment for use of a cart and a "reward" dispenser for compensating the patron after he has finished using the cart and returned it to the island.

One such dispensing system is illustrated in U.S. Pat. No. 3,978,959 issued to the inventor of the present invention on Sept. 7, 1976. The structure of that patent includes a dispenser apparatus having a monetary actuated control unit at the dispensing end of the island. Additionally, the island includes a coin refund unit at the end of the island at which carts are returned. Appropriate means are included to keep carts locked to the island once a cart is returned with a reward having been dispensed, and prior to the time when the cart is next released from the island after the proper fee is paid.

Typically, the carts are structured so that they are nestable together; that is, they interfit with one another so that successive carts after the first in the most utilize only a small portion of the total length of a cart. By making the carts so nestable, larger numbers can be provided in a given space than might otherwise be allowed. Space economization is, thereby, acheived.

One problem which has been encountered with this "reward" system whereby a patron is returned a "deposit" upon returning the cart to the island is that carts have been inserted in a reverse direction, thereby defeating the nesting feature. Consequently, if an island is of a given length and designed to exactly accommodate a certain number of carts, all the carts will not be able to be stored on the island if one is inserted in a reverse direction.

To illustrate the problem, one type of cart known in the art measures 36 inches in the direction of nesting. Each subsequent cart, however, after being inserted into the immediately preceding cart, adds only an additional 9 inches to the nest. For each cart, after the first one, a 75 percent reduction in the necessary accommodation space is, thereby, obtained. Assuming, for purposes of simplification, that the island is 72 inches in length, five carts could be accommodated if all carts were properly nested. If four carts are dispensed and the first returned cart is inserted in a reverse direction, there would be no overlapping of the two carts carried by the island, and the normally obtainable 75 percent reduction in required space for the second cart would not be realized. Consequently, all 72 inches of the island would be occupied by only two carts, and the other three carts would not be able to be returned to the island after their users have finished with them.

The invention of the present application is apparatus to preclude such reverse insertion of the previously dispensed carts. It thus solves the problems described hereinbefore.

SUMMARY OF THE INVENTION

The invention of the present application is a device for preventing insertion of a nestable structure, such as a cart, into a capturing apparatus, such as a dispensing island, in a direction other than a desired nesting direction. Typically, the capturing apparatus includes a channel having a slot extending longitudinally in the desired direction of nesting. The nesting structure includes a pair of bosses, each extending in an opposite lateral direction from the nesting structure. In this typical structure, each boss has an enlarged portion at its remote end. During nesting, the enlarged portion of a first boss is received within the channel with the remainder of the boss riding along the longitudinally extending slot. The anti-reversing device comprises a member which extends from the nestable structure laterally in the direction in which the second boss extends. The member is positioned relative to the second boss to that, if someone attempts to return the nesting structure to the capturing apparatus with the second boss received in the channel, the member will contact the entry end of the channel at a location spaced from the slot and preclude movement of the nesting structure in the longitudinal direction in which the slot extends.

In a preferred embodiment, the enlarged portions of the bosses can be rotatable to comprise wheels by which the nestable structure, or cart, is mounted for movement over the ground. The channel can comprise a track in which a first of the wheels can be received. The wheels can be mounted at ends of axle spaced along a common axis, which axles will form the non-enlarged portions of the two bosses. When the cart is inserted into the capturing structure, or island, in a desired nesting direction, a first wheel will enter the channel. If insertion of the second wheel into the channel is attempted, the anti-reversing device will engage the channel, at its entry end, to preclude entry of the second wheel thereinto and entry of its axle into the slot.

The second wheel can have an inwardly facing surface with an annular concavity formed therein. The concavity can be formed annularly with respect to the axle. The anti-reversing device or tab can be mounted at the axle of the second wheel and extend, at its opposite end, into the cavity.

Upper and lower portions of a wall of the channel, which portions are separated by the slot, can be spaced from one another at a uniform distance along the length of the slot. Typically, the anti-reversing tab would be attached to the axle and extend either upwardly or downwardly therefrom so as to maximize the angular separation of the tab from a position wherein it is aligned with the axle along the slot. If the axle and tab were in alignment, of course, the tab might not be able to serve its anti-reversing function unless it had a dimension, when in alignment with the axle along the slot, great enough to prevent its entry into the slot. The tab can, therefore, be structured with this dimension greater than the distance by which the portions of the wall defining the slot are separated.

Event when the extension the tab is spaced approximately 90 degrees from a position wherein it would be aligned along the slot with the axle, the cart might, conceivably, be rotated about its axle in an attempt to align the tab with the axle. The tab can, therefore, be structured with its dimension, in a direction aligned with the dimension of the slot transverse to its longitudinal extension, greater than the width of the slot.

The invention of the present application is thus a device which can preclude insertion of a nestable structure, such as a cart, into a capturing apparatus, such as a dispensing island, in a direction other than that desired. Specific advantages of the invention will become apparent with reference to the accompanying drawings, detailed description of the invention, and claims.

DETAILED DESCRIPTION OF THE INVENTION

Figure 1:
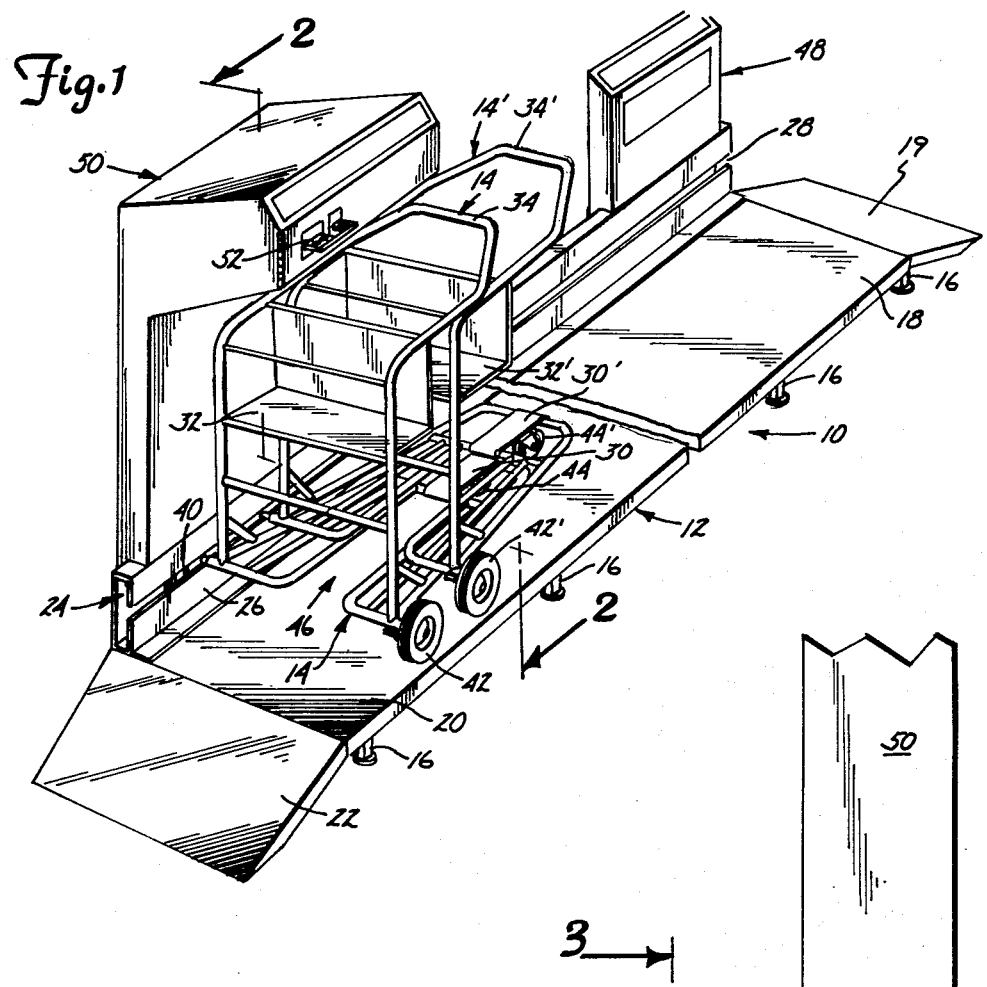
FIG. 1 is a view in perspective of an automatic self-service cart vending system illustrating a plurality of carts nested in a desired orientation.

Referring now to the drawings wherein like reference numerals denote like elements through the several views, FIG. 1 illustrates an automatic cart vending island system generally illustrated by the reference numeral 10. The vending island 10, as illustrated, includes an elongated platform portion 12 on which a plurality of carts 14, 14' are supported when captured by the island 10. Platform portion 12 is supported by a plurality of feet 16 above a floor surface.

Platform 12 includes, at an entry end 18 thereof, an entry ramp 19 by which carts 14, 14' can be raised onto platform 12. At a dispensing end 20 of island 10, an exit ramp 22 is provided to permit lowering of carts 14, 14' from platform 12 to the floor surface.

A channel member or track 24 is shown as extending substantially the full length of the raised platform 12. The track 24 has an outwardly facing wall 26 with a slot formed therein. The slot 28 extends longitudinally with respect to the direction of nesting of the carts 14, 14'.

Each cart 14, 14' includes a metal framework which can form a support surface 30, 30' for suitcases, large packages, etc. and support seat panels 32. A portion of the cart framework can form a rearwardly extending handle 34, 34' by which the cart can be maneuvered.

The carts' frameworks can be so structured in order to allow one cart 14 to nest with another 14'. By providing the carts 14, 14' with a structure whereby they can be nested, an island 10 of a given length can accommodate more carts. As seen in FIG. 1, although the island 10 must accommodate the full length of the forwardmost cart 14, only a relatively small portion of the second cart 14, which includes a rearmost portion of the cart's handle 34' and lower support surface 30' extends behind the forwardly cart 14.

Each cart includes a first boss assembly which extends from a first side of the cart 14 and a second boss assembly which extends from a second side of the cart 14. As best seen in FIG. 1, the boss assemblies can comprise axle 36, 38 mounting wheels 40, 42 with each wheel 40, 42 forming an enlarged portion at the remote end of the boss. Each cart 14, 14' can also include a caster 44 mounted to the lower support surface 30 proximate the rear end thereof to support the rear end of the cart 14.

In order to not defeat the nesting feature of the cart 14 each of the first and second wheels 40, 42 can be mounted on a separate axle 36, 38 respectively but aligned along a common axis. A passage 46 can, thereby, be defined essentially between the first and second wheels 40, 42 into which the caster 44 of an adjacent cart 14 can be received during nesting.

Additionally in order to not defeat the nesting feature of the cart 14, it is desireable that each cart 14 captured by the island 10 be moved onto the raised platform 12 with its first wheel 40 entering the channel 24 and the axle 36 supporting the first wheel 40 riding along the longitudinally extending slot 28. Once a wheel 40 has entered the channel, locking means (not shown) at the entry end of the island 10 preclude withdrawal of the cart 14 from the entry end. A person returning a cart, however, receives a "reward" for returning the cart, and a coin refund unit 48 is provided near the entry end of the island 10 for this purpose.

Carts can be moved relatively freely along the length of the island 10 with their first wheels 40 captured in and traveling along the channel 24. A dispenser apparatus 50 is provided at the exit end of the island 10 to control dispensing of carts 14 held by the island 10. The dispenser apparatus can include a monetary actuated control unit 52 operatively connected therewith. Locking means (not shown) can be provided in the channel 24 to preclude release of a cart unless the proper amount of money is inserted into the control unit 52.

Figure 2:
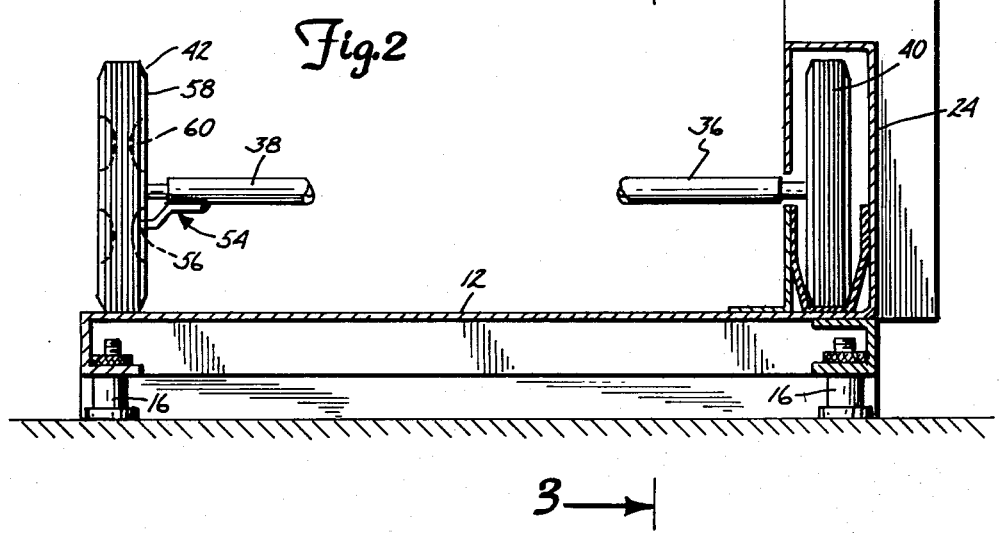
FIG. 2 is a view taken generally along the line 2—2 of FIG. 1.
Figure 3:
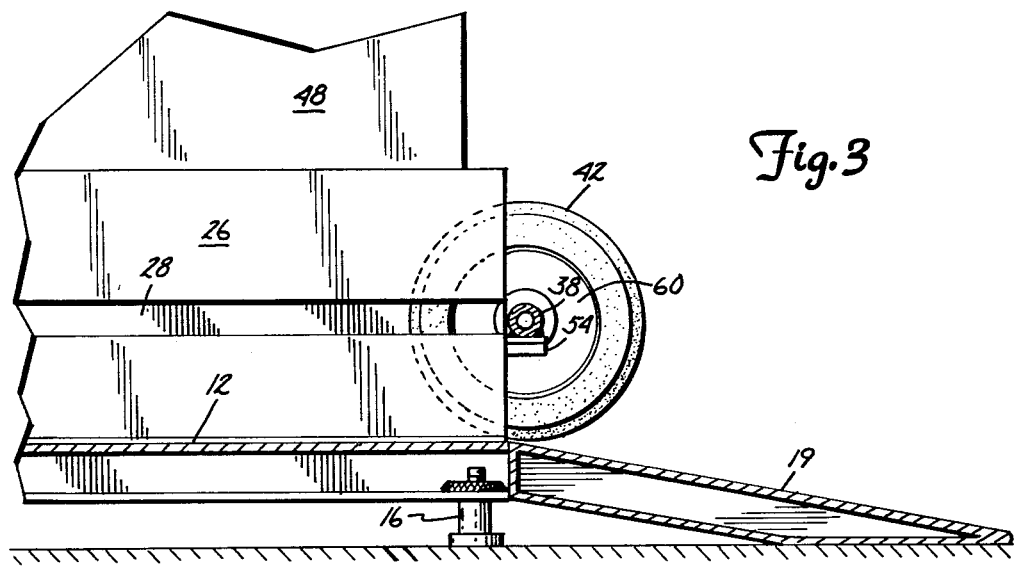
FIG. 3 is a view taken generally along the line 3—3 of FIG. 2 with the cart in a reverse orientation from that desired.

FIG. 2 illustrates carts properly received on the island 10. The carts first wheels are received within the channel 24 with their supporting axle 36 riding in the slot 28.

In order to preclude capture of a cart with it oriented in a direction opposite that of the desired nesting direction (that is, with its second wheel 42 captured in the channel 24), anti-reversing means are provided. As seen in FIGS. 2 through 6, the anti-reversing means can comprise a laterally extending member or tab 54. The tab 54 extends from the second side of the cart 14 and is disposed proximate the second wheel 42. In a preferred embodiment, the tab 54 is affixed, at one end thereof, to the axle 38 supporting the second wheel 42. A remote end 56 extends to a position, wherein, if insertion of the cart 14 onto the island 10 in a reverse orientation is attempted, the tab 54 will engage the entry end of the channel 24 at a location spaced from the entrance to the slot 28. Entry of the second wheel 42 of a cart 14 into the channel 24 is, thereby, precluded.

In order to insure engagement of the end of the channel 24 by the tab 54, the tab 54 should extend from the axle 38 at least to a plane defined by an inwardly facing surface 58 of the second wheel 42. As can be seen, the end of the tab 54 remote from the axle 38 can be positioned outside the periphery of the second wheel 42. In order to minimize the chances of damage to either person or property being inflicted by the remote end 56 of the tab 54, however, the inwardly facing surface 58 of the second wheel 42 can be provided with an annular concavity 60. The concavity 60 can be formed annularly with respect to the axle 38 supporting the second wheel 42. The remote end 56 of the tab 54 can extend into the concavity 60 and, since the concavity 60 is annular, will remain therein even as the wheel 42 rotates. As will be seen in view of this disclosure, such an arrangement of carts will preclude entry of the second wheel into the channel.

Figure 5:
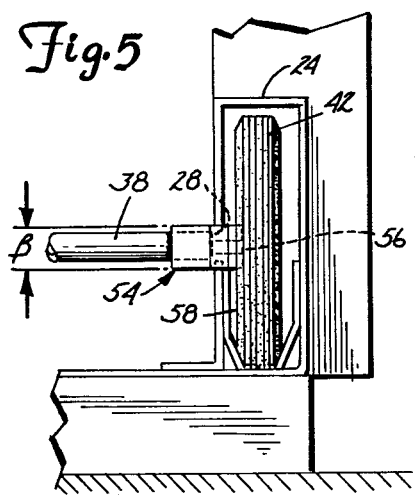
FIG. 5 is a view similar to that of FIG. 4 but with the cart rotated approximately 90° about the axles.
Figure 4:
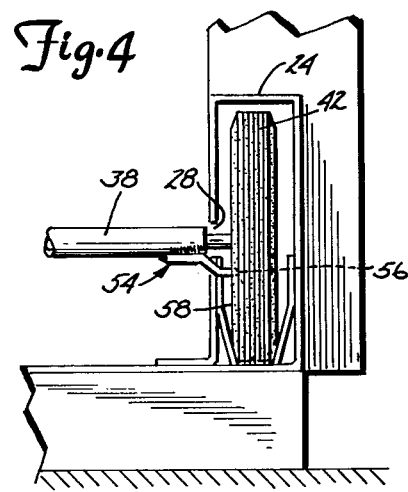
FIG. 4 is a view taken generally along the line 4—4 of FIG. 3.
Figure 6:
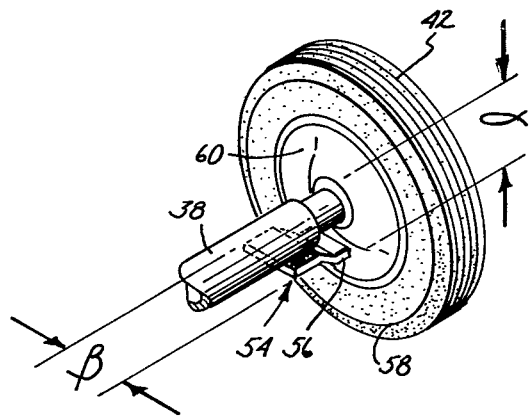
FIG. 6 is an enlarged view in perspective illustrating dimensions and relative positioning of the anti-reversing tab.

Referring now to FIG. 6, it can be seen that the tab can be made so that its remote end is spaced below the slot in which the supporting axle rides a distance α. Consequently, with the cart 14 oriented in its normal three point support position (that is, supported by the first and second wheels 40, 42 and the caster 44), the axle 38 supporting the second wheel 42 and the anti-reversing tab 54 will not be aligned along the slot 28. As seen in FIG. 5, however, wherein the cart 14 has been rotated about the axis of axle 36, 38 approximately 90° the anti-reversing tab 54 can be placed into alignment with the axle 38. The tab 54 can, therefore, be given a dimension β in a direction generally transverse to the direction in which the slot 28 extends longitudinally, when the supporting axle 38 and tab 54 are aligned, greater than the width of the slot 28. By so dimensioning the tab 54, it will preclude entry of the second wheel 42 into the channel 24 even when the tab 54 is aligned along the slot 28 with the axle 38.

Numerous characteristics and advantages of the invention been set forth in the foregoing description. It will be understood, however, that this disclosure is, in many respects, only illustrative, and changes may be made in details particularly in matterns of shape, size, and arrangement of parts without exceeding the scope of the invention. The scope of the invention is, of course, defined by the language in which the appended claims are expressed.

What is claimed is:

1. Apparatus for preventing reverse insertion of a nestable cart, having a pair of wheels, each mounted to a support axle spaced along an axis, onto a nesting island which includes a track having an outwardly facing wall with a slot extending longitudinally in a desired direction of nesting formed therein, wherein, during cooperative nesting, a first of the wheels travels in the track while its axle rides along the slot; said apparatus comprising a tab extending laterally from the cart proximate a second of the wheels and being positioned relative to the second wheel such that, if nesting of the cart with the second wheel traveling in the track is attempted, said tab will engage the track at an entry end thereof at a location spaced from the entrance to the slot.

2. Apparatus in accordance with claim 1 wherein said tab is attached to the cart at the axle of the second wheel.

3. Apparatus in accordance with claim 2 wherein the second wheel has an inner face opposite the first wheel and wherein said inner face has a concavity, annular with respect to its axle, formed therein, said tab extending from the axle of the second wheel and into said concavity.

4. Apparatus in accordance with claim 1 wherein the entrance to the slot has a dimension transverse to the direction in which the slot extends longitudinally, and wherein when the cart is rotated about the axis so that the axle of the second wheel and said tab are aligned along the slot, said tab has a dimension in the direction of said dimension of the slot greater than said dimension of the slot.

* * * * *

UNITED STATES PATENT AND TRADEMARK OFFICE
CERTIFICATE OF CORRECTION

PATENT NO. : 4,450,968
DATED : May 29, 1984
INVENTOR(S) : Muellner

It is certified that error appears in the above-identified patent and that said Letters Patent are hereby corrected as shown below:

Column 1, line 22, "Thus" read -- This --.

Column 3, line 25, "Event" read -- Even --.

Column 6, line 10, "matterns" read -- matters --.

Signed and Sealed this

Twenty-fifth Day of December 1984

[SEAL]

Attest:

GERALD J. MOSSINGHOFF

Attesting Officer    Commissioner of Patents and Trademarks